United States Patent
Espig et al.

(10) Patent No.: US 11,845,360 B2
(45) Date of Patent: Dec. 19, 2023

(54) BATTERY CHARGING BY TOWED REGENERATIVE BRAKING

(71) Applicant: Ford Global Technologies, LLC, Dearborn, MI (US)

(72) Inventors: Markus Espig, Aachen (DE); David van Bebber, Aachen (DE); Guido Hammes, Herzogenrath (DE)

(73) Assignee: Ford Global Technologies, LLC, Dearborn, MI (US)

( * ) Notice: Subject to any disclaimer, the term of this patent is extended or adjusted under 35 U.S.C. 154(b) by 328 days.

(21) Appl. No.: 17/133,485

(22) Filed: Dec. 23, 2020

(65) Prior Publication Data

US 2021/0197673 A1    Jul. 1, 2021

(30) Foreign Application Priority Data

Dec. 26, 2019   (DE) .......................... 102019135795.0

(51) Int. Cl.
| | | |
|---|---|---|
| *B60L 7/18* | (2006.01) | |
| *B60D 1/26* | (2006.01) | |
| *B60L 53/00* | (2019.01) | |
| *G05D 1/00* | (2006.01) | |

(52) U.S. Cl.
CPC .................. *B60L 7/18* (2013.01); *B60D 1/26* (2013.01); *B60L 53/00* (2019.02); *G05D 1/0088* (2013.01); *G05D 2201/0213* (2013.01)

(58) Field of Classification Search
CPC .. B60L 7/18; B60L 53/00; B60D 1/26; G05D 1/0088; G05D 2201/0213
See application file for complete search history.

(56) References Cited

U.S. PATENT DOCUMENTS

| | | | |
|---|---|---|---|
| 6,516,925 B1 | 2/2003 | Napier et al. | |
| 6,668,225 B2 | 12/2003 | Oh et al. | |
| 6,866,350 B2 | 3/2005 | Palmer et al. | |
| 7,712,760 B2 | 5/2010 | Ohtomo | |
| 7,743,849 B2 | 6/2010 | Kotsonis et al. | |
| 8,700,284 B2 | 4/2014 | Wojtkowicz et al. | |
| 2013/0332016 A1* | 12/2013 | Suzuki ................. | F02D 41/021 701/22 |
| 2016/0092962 A1* | 3/2016 | Wasserman .......... | H04M 3/487 705/26.7 |
| 2020/0324653 A1* | 10/2020 | Breen ..................... | B60L 58/12 |
| 2021/0039513 A1* | 2/2021 | Konrardy ........... | G06Q 10/1095 |
| 2022/0041069 A1* | 2/2022 | Layfield ............. | B60L 15/2045 |
| 2022/0234631 A1* | 7/2022 | Mandler ................ | B61G 3/16 |

FOREIGN PATENT DOCUMENTS

| | | |
|---|---|---|
| EP | 3388297 A1 | 10/2018 |
| NL | 1030159 C1 | 4/2007 |

* cited by examiner

*Primary Examiner* — Peter D Nolan
*Assistant Examiner* — Roy Rhee
(74) *Attorney, Agent, or Firm* — David Kelley; McCoy Russell LLP

(57) ABSTRACT

Methods and systems are provided for recharging a battery of a vehicle. In one example, a method includes activating a recuperative brake during a tow operation of a vehicle. The vehicle is an electric vehicle replenishing a state of charge of a battery thereof without transferring electrical energy from a towing vehicle to the vehicle.

13 Claims, 7 Drawing Sheets

BATTERY CHARGING BY TOWED REGENERATIVE BRAKING

CROSS REFERENCE TO RELATED APPLICATIONS

The present application claims priority to German Patent Application No. 102019135795.0, entitled "218-0779 Battery Charging by towed regenerative braking", and filed on Dec. 26, 2019. The entire contents of the above-listed application is hereby incorporated by reference for all purposes.

FIELD

The present description relates generally to charging a battery of a vehicle during a towing operation.

BACKGROUND/SUMMARY

Journeys over long distances with modern electrically drivable motor vehicles may be more cumbersome than with motor vehicles that comprise an internal combustion engine. The reason for this may be that an energy-content of modern traction batteries is less than the energy-content of a fuel tank that is filled with a fluid fuel, which may demand more charging stops in order to charge the traction battery than fueling stops in order to fuel with fluid fuel. In addition, recharging a vehicle may take longer than refueling a vehicle. Furthermore, the availability of charging stations may be relatively low and a vehicle through-put at a charging station may be less than a vehicle through-put at a fueling station.

As the percentage of electrically drivable motor vehicles increases, there is an increasing demand for charging options in the region of motorways and this demand is considerably greater than the possibilities currently on offer on motorways at least during peak-period traffic periods, for example at the beginning and/or at the end of holidays.

The publication U.S. Pat. No. 6,866,350 B2 discloses an activation of a recuperation brake of an electric vehicle while the vehicle is being towed by a towing vehicle in order to charge a battery of the vehicle and to brake the vehicle. If a driver of the towing vehicle actuates the brakes of the towing vehicle, the electric vehicle performs a regenerative braking procedure proportional to a braking signal from the towing vehicle. The electric vehicle also performs a regenerative braking procedure if the electric vehicle is inadvertently separated from a connector between the towing vehicle and the electric vehicle.

The publication NL 1,030,159 C1 discloses storing electrical energy that is generated during a braking process via brakes that act as electrical generators. This electricity is stored in a battery for future use, for example for purposes of driving the vehicle during journeys in built-up areas or when negotiating hills. This drive is provided by electric motors that are connected to wheels on the trailer. The battery is located under the trailer.

The publication U.S. Pat. No. 6,516,925 B1 discloses a system for braking a trailer that comprises an axle unit and is pulled by a vehicle. The system includes at least one electric machine, which is coupled to the axle unit, and at least one sensor that acts in such a manner that it measures a feature of the trailer and generates a first signal that represents the measured feature. In addition, the system comprises a controller that is connected via communication technology to the electrical machine and the sensor, wherein the controller is effective in such a manner that it receives a first signal and based on the first signal selectively outputs a second signal to the electrical machine, wherein the second signal causes the electric machine to apply a regenerative braking torque at the axle unit with the result that the trailer is braked and in so doing electrical energy is generated.

The publication U.S. Pat. No. 7,743,859 B2 discloses a trailer having a pair of wheels that are rotatably connected to a trailer frame. A motor can be operated in order to supply at least one of the wheels with a driving torque. An energy storage device is attached to the frame and can be operated in order to selectively provide the motor with energy. A load sensor can be operated in order to output a signal that indicates the magnitude of a load that is transferred between the trailer and a towing vehicle. A controller can be operated so that it generates control signals in reaction to the sensor signal. The control signals control the operation of the motor.

The publication U.S. Pat. No. 6,668,225 B2 discloses a control system for a combination vehicle that comprises a towing machine and a vehicle trailer. The control system comprises a computer, a storage device which can be accessed by the computer, sensors which are operatively connected to the computer, output signals from the computer, and at least two brake control units for wheels of the vehicle trailer, wherein the brake control units are connected to the computer and the computer receives input signals from the sensors of the combination vehicle and the computer calculates braking movements in order to control the movement of the combination vehicle.

The publication U.S. Pat. No. 7,712,760 B2 discloses a combination of a towing device, an electric vehicle, and a towing vehicle for towing the electric vehicle. The electric vehicle comprises a high-voltage line for supplying power from a storage device by way of an inverter to a drive motor, a storage device control unit for controlling the storage device, a vehicle control unit for controlling the drive motor and the high-voltage line, a low-voltage line for supplying voltage to the inverter, to the storage device control unit and to the vehicle control unit, and the electric vehicle comprises a communication network for transferring signals between the vehicle control unit, the inverter and the storage device control unit. The towing device comprises a connecting tool, which is mounted between the electric vehicle and the towing vehicle and transfers a towing force of the towing vehicle to the electric vehicle, and a communication cable, which is releasably connected to a connecting connection that is connected to the communications network and connects a drive motor prioritizing control unit, which is arranged in the towing vehicle, to the vehicle control unit. The towing device also comprises a power supply cable, which is releasably connected to a power supply connection that is connected to the low voltage line and connects a power/voltage source, which is arranged in the towing vehicle, to the low-voltage line.

The publication U.S. Pat. No. 8,700,284 B discloses a braking system for a towed vehicle, comprising a towing element for attaching the towed vehicle to a towing vehicle, wherein the towed vehicle comprises a traction engine and a traction battery. In addition, the braking system comprises a sensor for measuring a towing load in the towing element and a computer that is programmed so as to control a recuperation braking procedure of the towed vehicle based on the towing load.

The publication EP 3,388,297 A1 discloses a vehicle trailer having a tow bar, which comprises a tow bar housing and a tow rod, an energy recovery device for recovering energy that is generated via the vehicle trailer being braked, and an electronic control unit for controlling the energy recovery device. The vehicle trailer comprises a braking system having an overrun braking installation, wherein the tow rod can be inserted into the tow bar housing. A force measuring device that is electrically connected to the control unit is provided on the tow bar so as to measure the axial forces of the tow bar. A clamping device that cooperates with the tow rod is provided and during the forward travel of the vehicle trailer the clamping device prevents the tow rod being inserted into the tow bar housing when the tow bar thrust force is below a determined tow bar thrust force limit value and allows the tow rod to be inserted into the tow bar housing when a tow bar thrust force is above this tow bar thrust force value.

Thus, there is a demand to increase the availability of charging possibilities for electrically drivable vehicles.

In one example, the issues described above may be addressed by a method for activating a recuperative brake of a first vehicle being towed by a second vehicle. In this way, the first vehicle may recharge without an electrical connection between the first vehicle and the second vehicle.

As one example, the second vehicle may be a towing vehicle or may be another electrically powered vehicle towed by a towing vehicle. The first vehicle may physically couple to the second vehicle via a tether or other towing coupling device, wherein the first vehicle is pulled via motive force from the second vehicle. Recuperative braking of the first vehicle may be activate during an entirety of the towing operation. As such, the state of charge of the battery of the first vehicle may be replenished.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
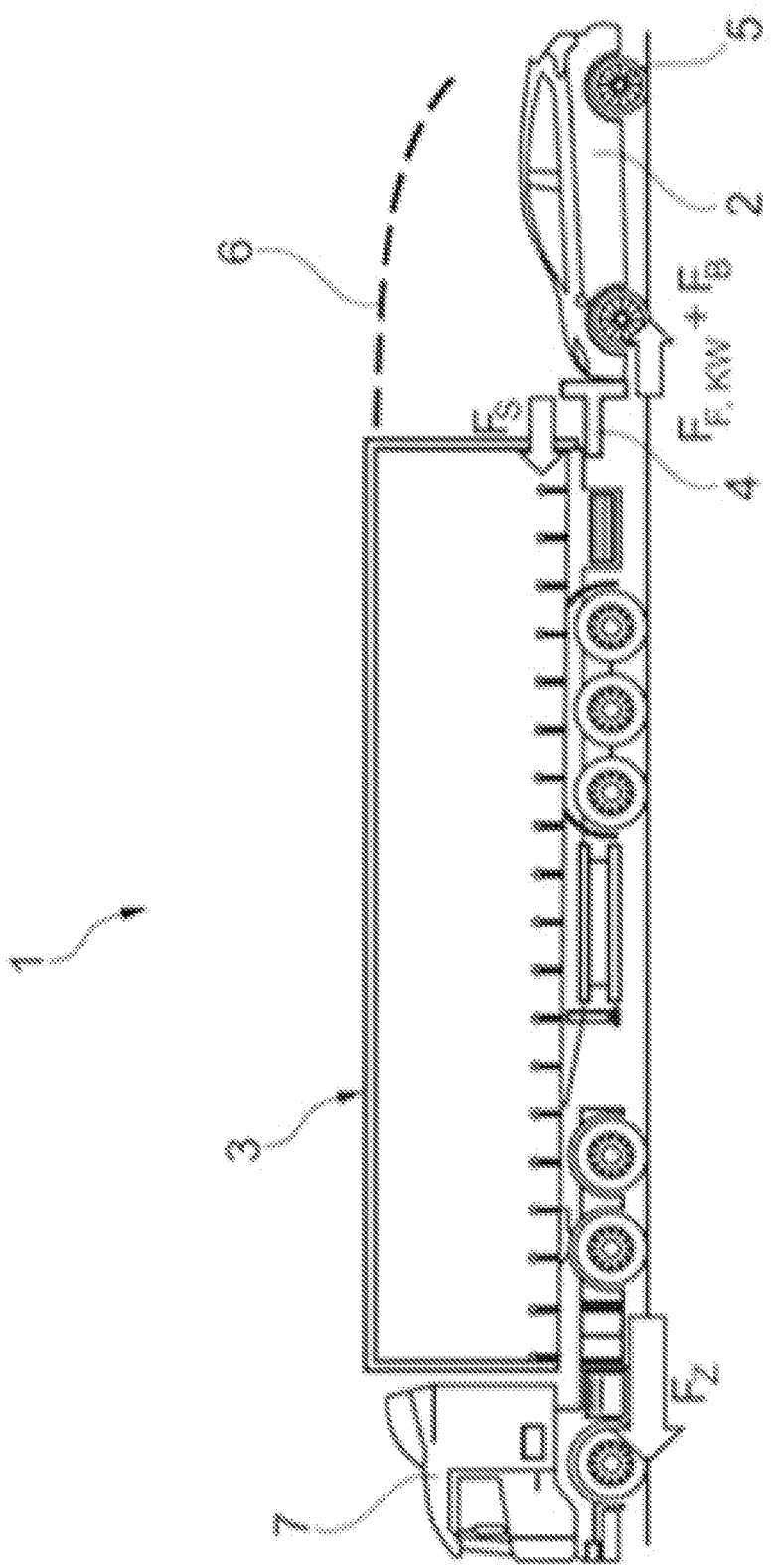
FIG. 1 illustrates a schematic illustration of an exemplary embodiment of a system of a tow vehicle and an electric vehicle
Figure 2:
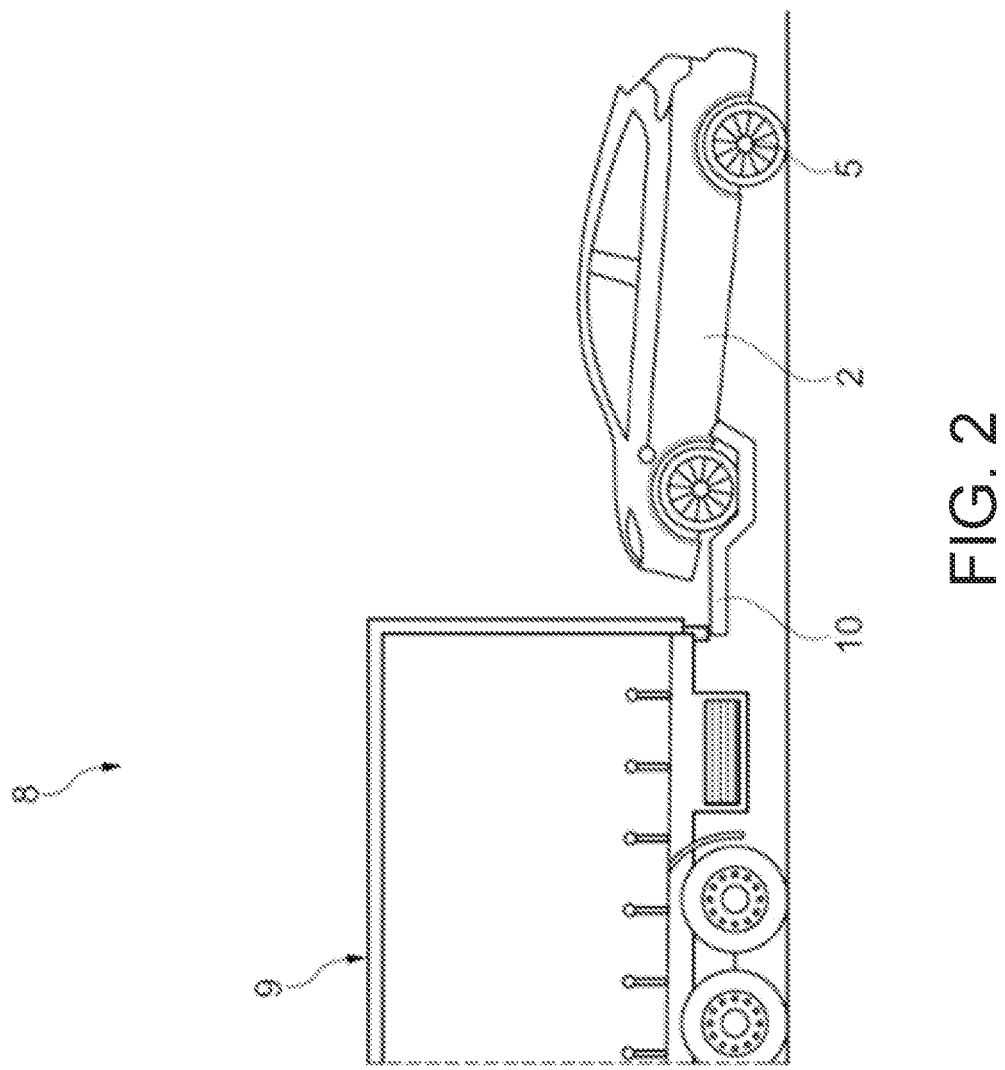
FIG. 2 illustrates a schematic illustration of a second embodiment of the tow vehicle and the electric vehicle.
Figure 3:
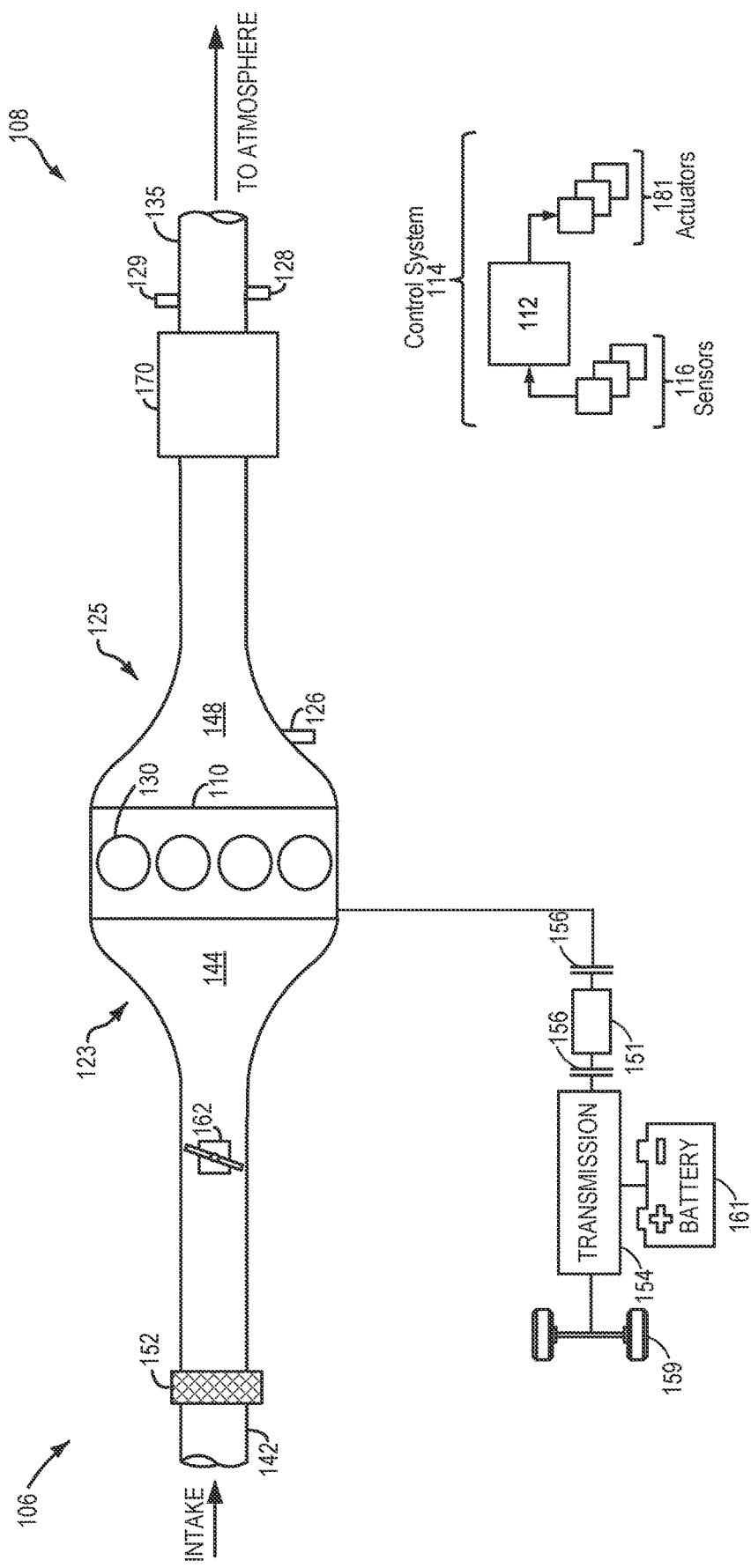
FIG. 3 illustrates an example of an engine of a hybrid vehicle.

The following description relates to systems and methods for an electric vehicle. The electric vehicle may be coupled to a towing vehicle, wherein the towing vehicle comprises a connection for recharging a battery of the electric vehicle. In one example, the towing vehicle is a vehicle free of hybrid abilities or other energy sources configured to drive a drive axle of the tow truck. FIGS. 1 and 2 show examples of the tow truck coupled to the electric vehicle. FIG. 3 shows an example engine schematic of the hybrid vehicle.

Figure 4:
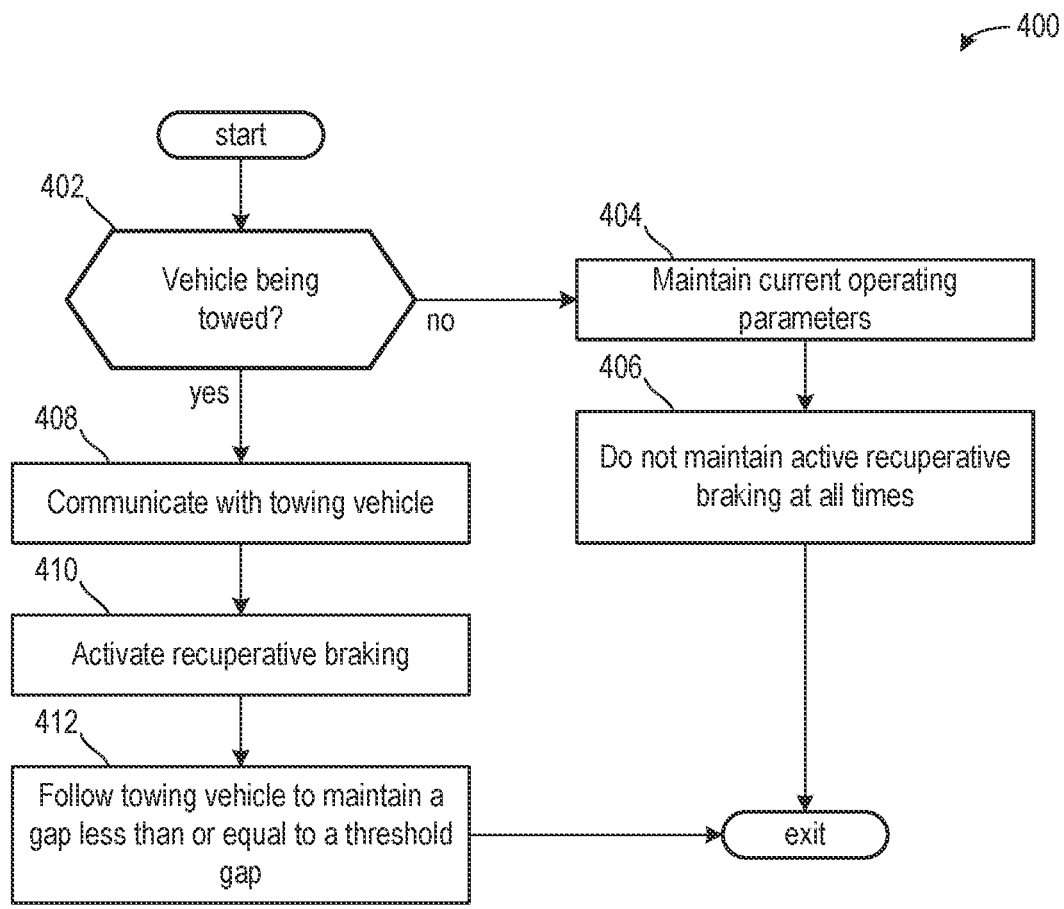
FIG. 4 illustrates a high-level flow chart showing a method of towing an electric vehicle via a tow vehicle.
Figure 5:
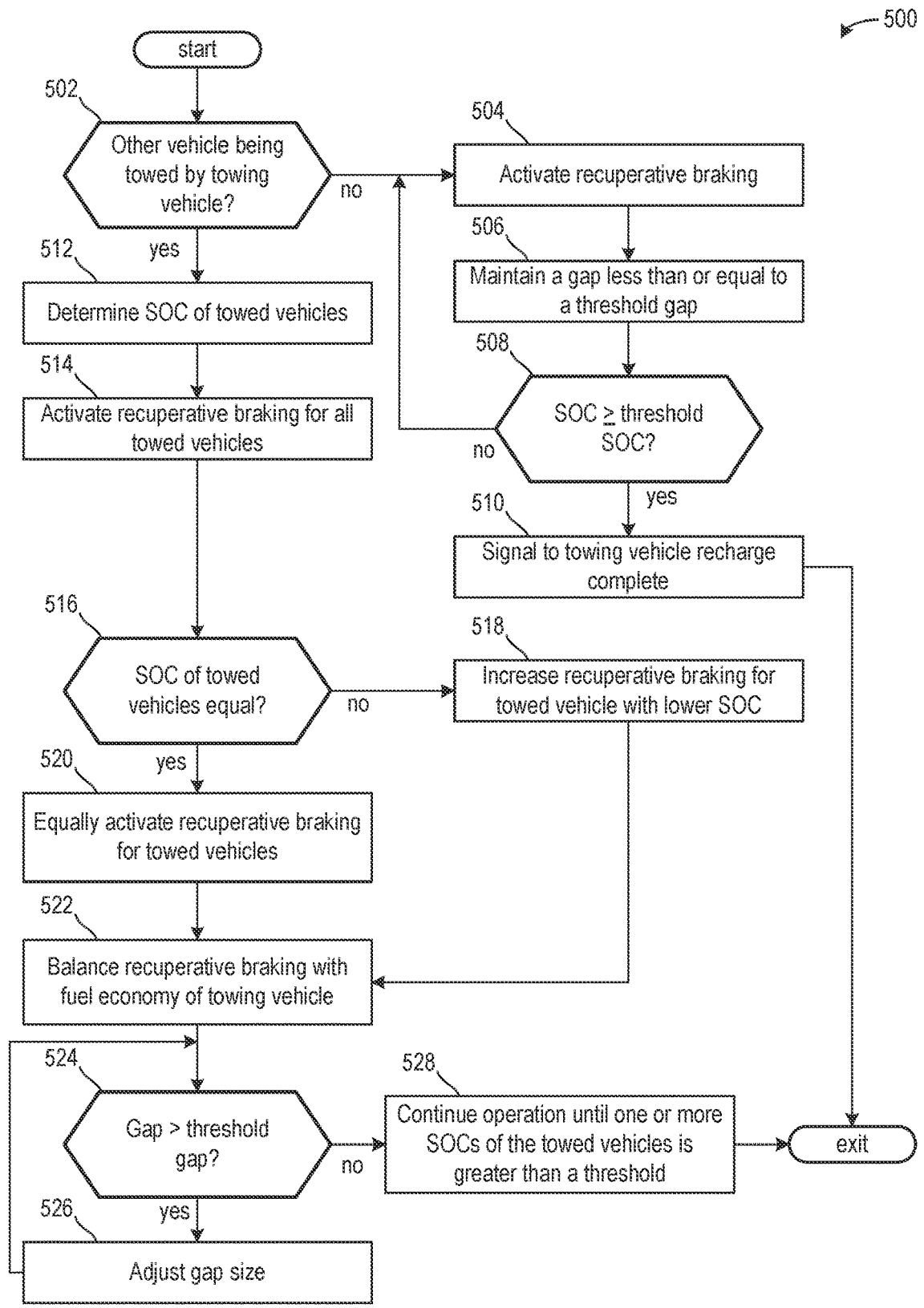
FIG. 5 illustrates a method for adjusting a driving operation of the electric vehicle as it is being towed.
Figure 6:
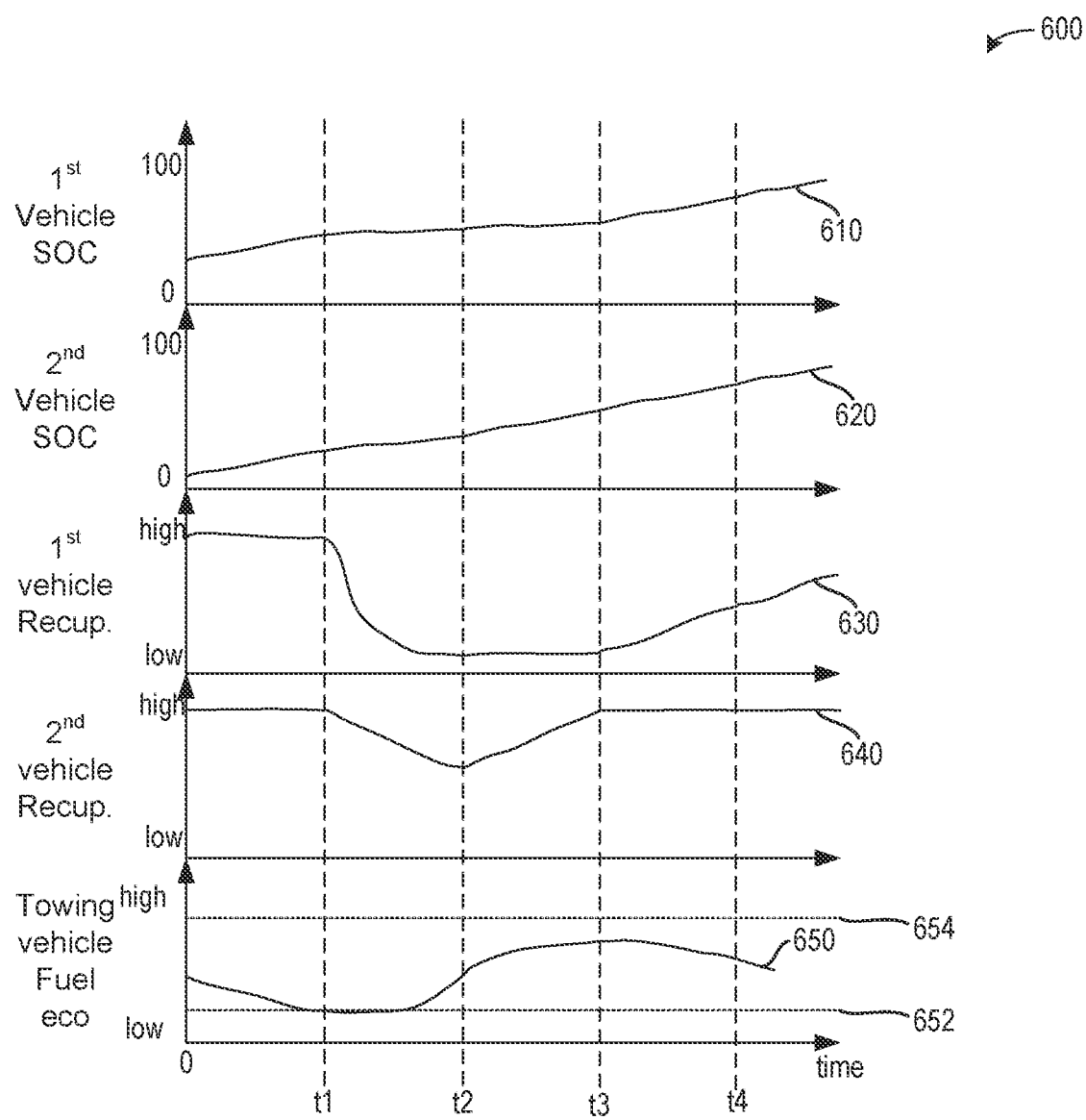
FIG. 6 illustrates a prophetic operating sequence including a towing vehicle, a first towed vehicle, and a second towed vehicle.
Figure 7:
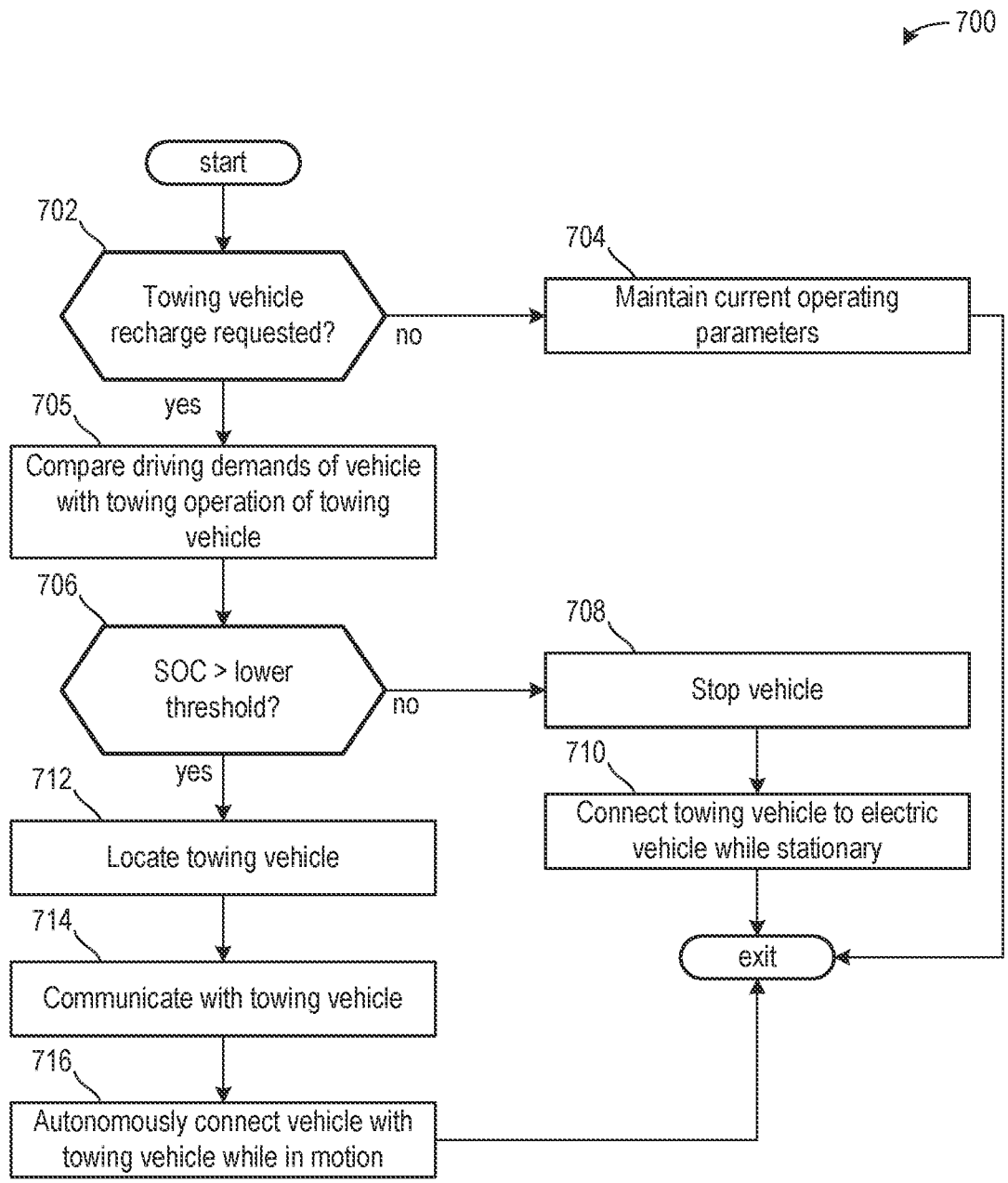
FIG. 7 illustrates a method for requesting a towing operation and selecting and coupling a towing vehicle to an at least partially electrically powered vehicle.

The towing vehicle may, additionally or alternatively, connect to the electric vehicle via only a physical coupling, such as a tow cable or the like, without electrically coupling to the electric vehicle. As such, the electric vehicle may replenish a battery state of charge of a battery thereof via regenerative braking. In this way, an additional onboard charger for the electric vehicle and/or the towing vehicle may be omitted (e.g., not included), which may decrease manufacturing costs and a packaging size. Methods for operating the towing vehicle and the electric vehicle are illustrated in FIGS. 4 and 5. An operating sequence of the towing vehicle towing two vehicles is illustrated in FIG. 6. A method for requesting a towing operation and selecting a towing vehicle is illustrated in FIG. 7.

As will be described herein, the electric vehicle, which is towed by the towing vehicle, may be operated autonomously. The autonomous driving of the electric vehicle may be in combination with signals from the towing vehicle, such that the electric vehicle may drive its wheels and steering column to match an operation of the towing vehicle. Furthermore, the electric vehicle may autonomously drive to maintain a desired distance between it and the towing vehicle, which may correspond to a gap less than a threshold gap. In one example, the threshold gap corresponds to a gap present on previous examples of towing vehicles and towed vehicles. As such, the towing vehicle and electric vehicle of the present disclosure may enhance road utilization while also reducing a need for additional charging infrastructure.

In accordance with the disclosure, a method with which at least one recuperation brake of the motor vehicle is kept continuously activated during the towing operation is shown.

Reference is made to the fact that the features and also measures that are individually mentioned in the description below can be combined with one another in any technically expedient manner and demonstrate further embodiments of the disclosure. The description characterizes and specifies the disclosure in particular in addition in conjunction with the figures.

In accordance with the disclosure, in order to charge the traction battery of the motor vehicle in the recuperation operation of the recuperation brake, the electrically drivable vehicle which can be in particular an electric vehicle or a hybrid electric vehicle is pulled with an activated recuperation brake via the towing vehicle during an entire towing operation, in other words while the towing vehicle is travelling and in so doing is pulling the motor vehicle or at least as long as the motor vehicle is connected to a towing unit of the towing vehicle. As a consequence, an increase in the journey time of a motor vehicle that is connected to a conventional charger at a fixed charging station is reduced since the motor vehicle moves in the direction of a destination during the charging procedure.

In addition, the motor vehicle's own recuperation braking system can be used for rapidly charging the traction battery with the result that it is not desired to provide a vehicle's own charging device and an additional charging infrastructure either in the towing vehicle or in the motor vehicle, which reduces costs and the weight.

Since the motor vehicle may be located in the slipstream of the moving towing vehicle, the total consumption of the two vehicles that are connected to one another is reduced.

By virtue of the reduced distance between the towing vehicle and the motor vehicle during the towing operation, it is possible in addition to make optimal use of the available space on roads.

Furthermore, the disclosure renders it possible to make additional use of the towing vehicle so as to provide services which are normally paid for, namely charging traction batteries of electrically drivable motor vehicles. As a consequence, the towing vehicle can be used to charge traction batteries in motor vehicles, for example depending upon the charge state, in other words depending upon an excess of towing force, which can be produced using the towing vehicle and is still available during the prevailing charge state and in particular during an unladen journey. In one example, the towing vehicle is a semi-truck or other similar vehicle. In some examples, when the towing vehicle is towing the electric vehicle, the towing vehicle may comprise a container with a load less than a threshold load.

The additional energy that is demanded by the towed motor vehicle as a result of traction resistance and the charging capacity can be provided with great efficiency via a towing vehicle having an internal combustion engine, in that a loading of the internal combustion engine of the towing vehicle is subsequently displaced, since as a consequence friction losses of the internal combustion engine are kept at a constant level, and thus the ratio between the additional fuel consumption and the additional power output is favorable.

The traction battery of the electrically drivable motor vehicle may be installed in the motor vehicle. The traction battery comprises a multiplicity of battery cells, in particular lithium ion battery cells.

The towing vehicle can be for example a transporter, a heavy goods vehicle, a road train, a semitrailer or the like, for example, but it can also be a passenger car having appropriate performance features. The towing vehicle can comprise an internal combustion engine and have a high pulling capability. The towing vehicle is equipped with at least one towing unit that can be connected to the motor vehicle in order to be able to tow the motor vehicle. The motor vehicle can comprise a mating piece that matches the towing unit and can be connected to the towing unit in order to attach the motor vehicle to the towing vehicle.

In some examples, the motor vehicle is attached at least indirectly to the towing vehicle during a driving operation of the towing vehicle. The motor vehicle can be attached to the driving towing vehicle for example in a part-automated or fully-automated driving operation of the motor vehicle, for example via an automated steering procedure and an automated proximity control procedure of the motor vehicle. In other words, the motor vehicle can be attached or disconnected during the driving operation. Consequently, it is not demanded to stop the driving operation with the result that the driving experience in accordance with the disclosure is even more efficient.

A further embodiment may include where the motor vehicle is attached directly to the towing vehicle or to at least one motor vehicle that is being towed by the towing vehicle. In the case of the first alternative, the motor vehicle can be connected to a towing unit of the towing vehicle. In the case of the second alternative, the motor vehicle can be attached to an electrically drivable motor vehicle that itself is directly attached to the towing vehicle. As a consequence, a towing vehicle can also pull two or more electrically drivable motor vehicles that are arranged in a row with respect to one another.

According to a further embodiment, the towing vehicle is selected individually for the motor vehicle, in that at least one piece of information relating to the towing vehicle is compared electronically on a web platform with at least one piece of information relating to the motor vehicle, wherein the pieces of information have been transmitted in advance by the towing vehicle or the motor vehicle to the web platform. As a consequence, it is possible to compare the pieces of information on the web platform in order to be able to establish whether there is a towing vehicle that is travelling in the travel direction of the motor vehicle, has sufficient pulling force to tow the motor vehicle, whether it has a suitable driving speed and the like. If this is the case, in other words if the offer provided by the towing vehicle matches the demands of the motor vehicle, the towing vehicle can be selected and a navigation system can inform the driver of the motor vehicle. The motor vehicle can subsequently approach the towing vehicle in order for the motor vehicle to be attached to the towing vehicle.

In accordance with a further embodiment, the motor vehicle is operated during the towing operation in such a manner that all the wheels of the motor vehicle are rolling on a surface being driven on. As a consequence, the motor vehicle can still be steered during the towing operation. The towing vehicle only needs to pull the motor vehicle without having to partially raise the motor vehicle. In this case, it is possible in the recuperation operation to operate the recuperation brakes that are allocated to the front wheels and/or rear wheels or other elements. It is possible to control the recuperation brakes individually via a control unit that can be integrated in a central control unit (CPU) with the result that at least one, more or each recuperation brake is activated and is maintained activated during the towing operation. The respective activation of the recuperation brake can be made dependent upon a charge state of the traction battery and the charge state is stored updated in the control device or in the CPU.

A further embodiment provides that the motor vehicle is operated during the towing operation by a vehicle controller at least in part in an autonomous driving operation and/or at least in part while taking into consideration driving parameters of the towing vehicle. In this case, the motor vehicle can follow the towing vehicle in an automated manner, also during a lane change.

According to a further embodiment, the motor vehicle is operated during the towing operation in such a manner that only the rear wheels of the motor vehicle roll on a surface that is being driven on, wherein the rear wheels are influenced via the recuperation brake with a braking force. In this case, the steerable front wheels of the motor vehicle are raised with the result that they are not in contact with the surface that is being driven on. The motor vehicle can therefore not be steered at least by way of the front wheels. However, it is feasible for them to be steered via the steerable rear wheels. As also in a previous case, in the case of this embodiment at least one, more or each recuperation brake can be controlled, in this case however with the exception of the recuperation brakes that are allocated to the front wheels. In such an example, separate electric motors may power the front and rear wheels, such that one or both of the electric motors may be used as generators during a towing operation to recharge a battery.

In one example, a motor vehicle is configured so as to maintain at least one recuperation brake of the motor vehicle continuously activated during all of the towing operation.

In some examples, a method may be associated with the system. In particular, the system can be used for performing the method in accordance with one of the above-mentioned embodiments or in accordance with a combination of at least two of these embodiments with one another. The system can also comprise two or more, in particular a multiplicity, of electrically drivable motor vehicles and towing vehicles.

In accordance with one embodiment of the system, the motor vehicle is attached at least indirectly to the towing vehicle during a driving operation of the towing vehicle. It is possible to attach the motor vehicle to the driving towing vehicle for example in a part-automated or fully automated driving operation of the motor vehicle, for example via an automated steering procedure and an automated proximity control procedure of the motor vehicle. In other words, it is possible to attach or disconnect the motor vehicle during the driving operation. It is therefore not demanded to stop the driving operation with the result that the system in accordance with the disclosure is even more efficient. The enhancements that are mentioned above with regard to the corresponding embodiment of the method are accordingly associated with this embodiment.

In one embodiment, the motor vehicle is configured so as to tow a further electrically drivable motor vehicle. For this purpose, the motor vehicle can comprise a towing unit that can be connected to the other motor vehicle whereas the motor vehicle itself is connected via a towing unit of the towing vehicle. The enhancements that are mentioned above with regard to the corresponding embodiment of the method are accordingly associated with this embodiment.

A further embodiment provides that the system comprises at least one web platform that can be connected via communication technology to the towing vehicle and the motor vehicle, wherein, in order to be able to individually select the towing vehicle for the motor vehicle. The web platform is configured so as to compare electronically with one another at least one piece of information that relates to the towing vehicle and is transmitted by the towing vehicle to the web platform and at least one piece of information that relates to the motor vehicle and is transmitted by the motor vehicle to the web platform. The enhancements that are mentioned above with regard to the corresponding embodiment of the method are accordingly associated with this embodiment.

In a further embodiment, the towing vehicle comprises at least one rear-side towing unit that can be connected to the motor vehicle and is embodied in such a manner that, during the towing operation during which the motor vehicle is connected to the towing unit, all the wheels of the motor vehicle roll on a surface that is being driven on. In this case, the recuperation brakes that are allocated to the front wheels and/or rear wheels or other elements can be operated in the recuperation operation. It is possible via a control unit that can be integrated in a central control unit (CPU) to control the recuperation brakes individually with the result that at least one, more or each recuperation brake is activated and is kept activated during the towing operation. The respective activation of the recuperation brake can be made dependent upon a charge state of the traction battery and the charge state is stored updated in the control device or in the CPU. The enhancements that are mentioned above with regard to the corresponding embodiment of the method are accordingly associated with this embodiment.

In a further embodiment, the motor vehicle is configured so as during the towing operation to be operated by a vehicle controller of the motor vehicle at least in part in an automated driving operation or at least in part while taking into consideration driving parameters of the towing vehicle. The enhancements that are mentioned above with regard to the corresponding embodiment of the method are accordingly associated with this embodiment.

A further embodiment provides that the towing vehicle comprises at least one rear-side towing unit that can be connected to the motor vehicle and is embodied in such a manner that, during the towing operation during which the motor vehicle is connected to the towing unit, only the rear wheels of the motor vehicle roll on a surface that is being driven on. The motor vehicle can therefore not be steered at least by way of the front wheels. However, it is feasible for them to be steered via the steerable rear wheels. As also in a previous case, in the case of this embodiment at least one, more or each recuperation brake can be controlled, in this case however with the exception of the recuperation brakes that are allocated to the front wheels. The advantages that are mentioned above with regard to the corresponding embodiment of the method are accordingly associated with this embodiment.

FIGS. 1-3 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another.

As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

Turning now to FIG. 1, it illustrates a schematic illustration of an exemplary embodiment for a system 1 in accordance with the disclosure for charging at least one traction battery of an electrically drivable motor vehicle 2.

The system 1 may comprise at least one electrically drivable motor vehicle 2 and at least one towing vehicle 3 in the form of a semitrailer for towing the motor vehicle 2 in a towing operation. For this purpose, the towing vehicle 3 may comprise a rear-side towing unit 4 (illustrated schematically) that is connected to the motor vehicle 2 and is embodied in such a manner that, during the towing operation during which the motor vehicle 2 is connected to the towing unit 4, all the wheels 5 of the motor vehicle 2 roll on a surface that is being driven on, such as pavement, dirt, gravel, and the like. During the towing operation, the motor vehicle 2 is located in an indicated slipstream 6 of the towing vehicle 3.

The motor vehicle 2 may be configured to keep a recuperation brake (not illustrated) of the motor vehicle 2 continuously activated during the towing operation. In this case, the motor vehicle 2 is also configured so as during the towing operation to be operated by a vehicle controller of the motor vehicle 2 at least in part in an autonomous driving operation or at least in part while taking into consideration driving parameters of the towing vehicle 3. The motor vehicle 2 can be configured so as to tow a further electrically drivable motor vehicle. That is to say, the motor vehicle 2 may be a first motor vehicle 2, wherein a second motor vehicle may be coupled to the first motor vehicle 2 and towed via power output from the towing vehicle 3.

The towing vehicle 3 or its towing machine 7 generates a towing force FZ. This pulling force FZ provides the towing force FS for towing the motor vehicle 2. The towing force FS counteracts in addition to the driving resistance FF,KW of the motor vehicle 2 a recuperation braking force FB of the motor vehicle 2. The following equation 1 applies:

$$FZ=FF,SW+FS=FF,SW+FF,KW+FB;$$ (Equation 1)

wherein FF,SW represents the driving resistance of the towing vehicle 3 and, as mentioned above, FF,KW represents the driving resistance of the motor vehicle 2.

Moreover, the system 1 can comprise a web platform that can be connected via communication technology to the towing vehicle 3 and the motor vehicle 2, wherein, in order to be able to individually select the towing vehicle 3 for the motor vehicle 2, the web platform is configured so as to compare electronically with one another at least one piece of information that relates to the towing vehicle 3 and is transmitted by the towing vehicle 3 to the web platform and at least one piece of information that relates to the motor vehicle 2 and is transmitted by the motor vehicle 2 to the web platform and to indicate to the motor vehicle 2 or its driver where the towing vehicle 3 is located.

In one example, the towing vehicle 3 and the motor vehicle 2 may be wirelessly connected in a communicable manner via Bluetooth, a modem/router, P2P, a dedicated short-range communication network, or the like. The towing vehicle 3 and the motor vehicle 2 may directly communicate, in one example. In another example, additionally or alternatively, the towing vehicle 3 and the motor vehicle 2 may communicate with the web platform, hosted on a server or the like, wherein the web platform receives signals from the towing vehicle 3 and signals one or more instructions to the motor vehicle 2, or vice-versa.

Turning now to FIG. 2, it illustrates a schematic view of a further exemplary embodiment for a system 8 in accordance with the disclosure for charging at least one traction battery (not illustrated) of an electrically drivable motor vehicle 2. The system 8 differs from the exemplary embodiment illustrated in FIG. 1 solely by virtue of the fact that the towing vehicle 9 comprises a rear-side towing unit 10 that is connected to the motor vehicle 2 and is embodied in such a manner that, during the towing operation during which the motor vehicle 2 is connected to the towing unit 10, only the rear wheels 5 of the motor vehicle 2 roll on a surface that is being driven on. In order to avoid repetitions, reference is made moreover to the above description relating to FIG. 1.

FIG. 3 shows a schematic depiction of a hybrid vehicle system 106 that can derive propulsion power from engine system 108 and/or an on-board energy storage device. An energy conversion device, such as a generator, may be operated to absorb energy from vehicle motion and/or engine operation, and then convert the absorbed energy to an energy form suitable for storage by the energy storage device.

Engine system 108 may include an engine 110 having a plurality of cylinders 130. Engine 110 includes an engine intake 123 and an engine exhaust 125. Engine intake 123 includes an air intake throttle 162 fluidly coupled to the engine intake manifold 144 via an intake passage 142. Air may enter intake passage 142 via air filter 152. Engine exhaust 125 includes an exhaust manifold 148 leading to an exhaust passage 135 that routes exhaust gas to the atmosphere. Engine exhaust 125 may include one or more emission control devices 170 mounted in a close-coupled position or in a far underbody position. The one or more emission control devices may include a three-way catalyst, lean NOx trap, diesel particulate filter, oxidation catalyst, etc. It will be appreciated that other components may be included in the engine such as a variety of valves and sensors, as further elaborated in herein. In some embodiments, wherein engine system 108 is a boosted engine system, the engine system may further include a boosting device, such as a turbocharger (not shown).

Vehicle system 106 may further include control system 114. Control system 114 is shown receiving information from a plurality of sensors 116 (various examples of which are described herein) and sending control signals to a plurality of actuators 181 (various examples of which are described herein). As one example, sensors 116 may include exhaust gas sensor 126 located upstream of the emission control device, temperature sensor 128, and pressure sensor 129. Other sensors such as additional pressure, temperature, air/fuel ratio, and composition sensors may be coupled to various locations in the vehicle system 106. As another example, the actuators may include the throttle 162.

Controller 112 may be configured as a conventional microcomputer including a microprocessor unit, input/output ports, read-only memory, random access memory, keep alive memory, a controller area network (CAN) bus, etc. Controller 112 may be configured as a powertrain control module (PCM). The controller may be shifted between sleep and wake-up modes for additional energy efficiency. The controller may receive input data from the various sensors, process the input data, and trigger the actuators in response to the processed input data based on instruction or code programmed therein corresponding to one or more routines.

In some examples, hybrid vehicle 106 comprises multiple sources of torque available to one or more vehicle wheels 159. In other examples, vehicle 106 is a conventional vehicle with only an engine, or an electric vehicle with only electric machine(s). In the example shown, vehicle 106 includes engine 110 and an electric machine 151. Electric machine 151 may be a motor or a motor/generator. A crankshaft of engine 110 and electric machine 151 may be connected via a transmission 154 to vehicle wheels 159 when one or more clutches 156 are engaged. In the depicted example, a first clutch 156 is provided between a crankshaft and the electric machine 151, and a second clutch 156 is provided between electric machine 151 and transmission 154. Controller 112 may send a signal to an actuator of each clutch 156 to engage or disengage the clutch, so as to connect or disconnect crankshaft from electric machine 151 and the components connected thereto, and/or connect or disconnect electric machine 151 from transmission 154 and the components connected thereto. Transmission 154 may be a gearbox, a planetary gear system, or another type of transmission. The powertrain may be configured in various manners including as a parallel, a series, or a series-parallel hybrid vehicle.

Electric machine 151 receives electrical power from a traction battery 161 to provide torque to vehicle wheels 159. Electric machine 151 may also be operated as a generator to provide electrical power to charge battery 161, for example during a braking operation.

In one example, vehicle system 106 represents one example of a vehicle that may be towed via a towing vehicle and recharged during a towing operation. Additionally or alternatively, engine system 100 may be omitted from vehicle system 106 such that the vehicle system 106 is propelled via only electrical power.

Turning now to FIG. 4, it shows a high-level flow chart illustrating a method 400 for recharging a vehicle as it is towed via a towing vehicle. Instructions for carrying out method 400 and the rest of the methods included herein may be executed by a controller based on instructions stored on a memory of the controller and in conjunction with signals received from sensors of the engine system, such as the sensors described above with reference to FIG. 3. The controller may employ engine actuators of the engine system to adjust engine operation, according to the methods described below.

The method 400 begins at 402, which includes determining if a vehicle is being towed (e.g., undergoing a towing operation). The vehicle may be towed via a towing vehicle or another vehicle connected to the towing vehicle. The vehicle may determine it is being towed in response to one or more of a signal from the towing vehicle, a towing cable being physically coupled to the vehicle, and the vehicle being propelled without the drive axle being powered.

If the vehicle is not being towed, then the method 400 may proceed to 404, which includes maintaining current operating conditions. The method 400 may proceed to 406, which includes not maintaining at least one recuperative brake active while wheels are touching a road. The road is merely one example of a surface and/or a ground on which the vehicle can travel on. The road may include materials such as pavement, concrete, gravel, sand, dirt, and the like.

Returning to 402, if the vehicle is being towed, then the method 400 may proceed to 408, which includes communicating with the towing vehicle. Communication may be direct, via a short-range dedicated network, Bluetooth, and the like. Additionally or alternatively, the communication may be indirect, wherein each of the towing vehicle and the vehicle communicate with a web service, which may include a database, wherein the web service may receive inputs from the towing vehicle and the towed vehicle, and send outputs to the towing vehicle and the towed vehicle. In one example, the towing vehicle and the towed vehicle communicate with the web server via a modem/router or the like.

The method 400 may proceed to 410, which includes activating at least one recuperative brake of the towed vehicle. In one example, activation of more than one recuperative brake, for a vehicle with electric motors coupled to the front and rear wheels, may be based on one or more of an engine load of the towing vehicle, a fuel economy of the towing vehicle, a state of charge of the towed vehicle, a gap between the towed vehicle and the towing vehicle, and the like. As one example, if the fuel economy of the towing vehicle decreases to less than a threshold fuel economy, then recuperative brakes of the towed vehicle may be deactivated to increase the towing vehicle fuel economy. As another example, a recuperative braking magnitude of the towed vehicle may be increased in response the state of charge of the towed vehicle being further from a threshold state of charge than a more charge condition.

The method 400 may proceed to 412, which includes following the towing vehicle to maintain a gap less than or equal to a threshold gap. In one example, this step may be omitted if the towing device coupling the towing vehicle to the towed vehicle is rigid and maintains a constant gap distance. Additionally or alternatively, if the towing device is flexible, then the towing device may be actuated via a pulley, a winch, or other similar system to adjust a gap size between the towing vehicle and the towed vehicle.

Turning now to FIG. 5, it shows a method 500 for towing two or more vehicles via the towing vehicle. In one example, the method 500 is executed following or in combination with the method 400. As such, the method 500 may be executed after the determination that a vehicle is being towed.

The method 500 begins at 502, which includes determining if another vehicle is being towed by the towing vehicle. In one example, the towing vehicle may be configured to tow a plurality of vehicles. Since the towing vehicle does not provide power to the battery and only provides motive power to towed vehicles. In this way, a number of vehicles which may be towed by the towing vehicle may be limited via one or more of a towing power of the towing vehicle, a length of the slipstream, a towing vehicle fuel economy, and the like. The vehicles may be coupled in series, such that a first towed vehicle is coupled to the towing vehicle via a first tow cable and a second towed vehicle is coupled to the first towed vehicle via a second tow cable.

If another vehicle is not being towed, then the method 500 may proceed to 504, which includes activating recuperative braking during an entirety of the towing operation.

The method 500 may proceed to 506, which includes maintaining a gap between the towed vehicle and the towing vehicle at less than or equal to the threshold gap, as described above with respect to FIG. 4.

The method 500 proceeds to 508, which includes determining if a state of charge (SOC) of the towed vehicle is greater than or equal to a threshold SOC. The threshold SOC may be based on a maximum charge state of the towed vehicle. In one example, the threshold SOC is equal to 80% of a maximum charge state of the towed vehicle. In some examples, additionally or alternatively, since an operator may request the tow service, the operator of the towed vehicle may select the threshold SOC. For example, the operator may select the threshold SOC to equal 50% of a maximum charge state. Thus, the threshold SOC may be a dynamic value.

If the SOC is less than the threshold SOC, then the method 500 continues to maintain at least one recuperative brake active, maintains the gap, and continues to monitor the SOC of the towed vehicle. If the SOC is greater than or equal to the threshold SOC, then the method 500 proceeds to 510, which includes signaling to the towing vehicle the recharge is complete. The signaling may be direct via a short-range network or may be long-range via Wi-Fi or the like.

Returning to 502, if another vehicle is being towed by the towing vehicle, then the method 500 proceeds to 512, which includes determining the SOC of each of the towed vehicles. The towed vehicles may relay their respective SOCs to the server or directly to the towed vehicle, in one example. Additionally or alternatively, the towed vehicles may relay their respective SOCs to the server or to one another.

The method 500 may proceed to 514, which includes activating recuperative braking for all the towed vehicles. As such, electric motors of the first vehicle and the second vehicle may be operated as generators, wherein power from the wheels is transferred to the battery via the reverse operation of the electric motors.

In some examples of the first vehicle and the second vehicle may comprise more than one electric motor respectively. For example, the first vehicle and/or the second vehicle may comprise a first electric motor coupled to an axle of a front wheel set and a second electric motor coupled to an axle of a rear wheel set. As such, recuperative braking may be increasingly adjusted via adjusting operation of one or more of the first electric motor and the second electric motor as will be described in greater detail below.

The method 500 proceeds to 516, which includes determining if the SOC of the towed vehicles is equal. The SOC of the towed vehicle may be equal if they are within a threshold amount of one another (e.g., 10% or less difference between the SOCs). If the SOCs of the towed vehicles is not equal, then the method 500 may proceed to 518, which includes increasing recuperative braking for the towed vehicle with the lower SOC. In this way, the towed vehicle with the lower SOC may comprise a higher amount of recuperative braking than the towed vehicle with the higher SOC.

Returning to 516, if the SOC of the towed vehicles are equal, then the method 500 may proceed to 520, which includes equally activing recuperative braking in the towed vehicles. In this way, resistance to the towing vehicle due to recuperative braking may be equally generated via the towed vehicles (independent of a vehicle weight and other factors). This may be desired during turns, lane changes, or other driving maneuvers.

The method 500 may proceed to 522, following 520 or 518, which includes balancing recuperative braking of the towed vehicles with a fuel economy of the towing vehicle. In one example, recuperative braking may be reduced in a towed vehicle with a higher SOC relative to a towed vehicle with a lower SOC in response to the fuel economy of the towing vehicle decreasing below a lower threshold fuel economy. If the SOCs of the towed vehicles are equal, then recuperative braking of the towed vehicles may be decreased equally. In some examples, if the fuel economy of the towing vehicle is above an upper threshold fuel economy, then recuperative braking of the towed vehicles may be increased to increase a rate of SOC replenishment in the towed vehicles.

The method 500 may proceed to 524, which includes determining if the gap is greater than the threshold gap, as described above with respect to method 400 of FIG. 4.

If the gap is greater than the threshold gap, then the method 500 may proceed to 526, which includes adjusting a towing device length to reduce the gap. The gap may correspond to a gap between the towing vehicle and the first vehicle or between the first vehicle and the second vehicle.

Returning to 524, if the gap is not greater than the threshold gap, then the method 500 may proceed to 528, which includes continuing operation until one or more SOCs of the towed vehicle is greater than a threshold SOC. In one example, the threshold SOC may be different for each of the towed vehicles, wherein the threshold SOC may be set by an operator of each of the towed vehicles.

The gap may be a gap between the towing vehicle and the first vehicle or between the first vehicle and the second vehicle, and so on. For example, if the gap between the first vehicle and the second vehicle is greater than a threshold gap, then recuperative braking of one or more of the first vehicle or the second vehicle may be adjusted. For example, recuperative braking of the first vehicle may be increased and/or recuperative braking of the second vehicle may be decreased. In some examples, the threshold gap may be a dynamic value, wherein a first threshold gap is desired between the towing vehicle and the first vehicle and a second threshold gap is desired between the first vehicle and the second vehicle, wherein the first threshold gap and the second threshold gap may be different values. In one example, the second threshold gap is less than the first threshold gap. For example, if the gap between the towing vehicle and the first towed vehicle is too large, then the recuperative braking of the first vehicle may be adjusted. As another example, if the gap between the first vehicle and the second vehicle is too large, then the recuperative braking of the first vehicle or the second vehicle may be adjusted.

Turning now to FIG. 6, it shows a plot 600 illustrating an operating sequence for a towing vehicle towing a first vehicle and a second vehicle. Plot 610 illustrates a first vehicle state of charge (SOC). Plot 620 illustrates a second vehicle SOC. Plot 630 illustrates a magnitude of a first vehicle recuperative braking. Plot 640 illustrates a magnitude of a second vehicle recuperative braking. Plot 650 illustrates a towing vehicle fuel economy, where dashed line 652 illustrates a lower threshold fuel economy and dashed line 654 illustrates an upper threshold fuel economy. Time increases from a left to right side of the figure.

Prior to t1, the first vehicle SOC (plot 610) is greater than the second vehicle SOC (plot 620). The first vehicle recuperative braking and the second vehicle recuperative braking are relatively high (plots 630 and 640, respectively). In one example, the higher the recuperative braking is, the higher a resistance applied from the towed vehicle to the towing vehicle. As a result, the towing vehicle fuel economy (plot 650) may decrease toward the lower threshold fuel economy (dashed line 652).

At t1, the towing vehicle fuel economy decreases to a fuel economy less than the lower threshold fuel economy. Between t1 and t2, the first vehicle recuperative braking is reduced to a relatively low magnitude and the second vehicle recuperative braking is reduced to a recuperative braking magnitude between a relatively high and a relatively low. In this way, the second vehicle recuperative braking is reduced less than the first vehicle recuperative braking due to the first vehicle SOC being greater than the second vehicle SOC in response to the towing vehicle fuel economy falling below the lower threshold fuel economy. The towing vehicle fuel economy begins to increase and is no longer below the lower threshold fuel economy as there is less resistance on the towing vehicle due to the reduction in recuperative braking in the towed vehicles. During this time, the second vehicle SOC increases at a higher rate than the first vehicle SOC.

At t2, the second vehicle recuperative braking begins to increases. Between t2 and t3, the second vehicle recuperative braking continues to increase to the relatively high recuperative braking while the first vehicle recuperative braking is maintained constant at the relatively low magnitude. The towing vehicle fuel economy continues to increase, which may be due to a road gradient change, traffic change, or other environmental driving condition change. In one example, prior to t1 through t2, the towing vehicle may have been driven along an incline, resulting in an increased load of the towing vehicle, and reduced fuel economy. However, between t2 and t3, the towing vehicle may be driving on a flat road or a downhill.

At t3, the first vehicle recuperative braking begins to increase. Between t3 and t4, the first vehicle recuperative braking continues to increase as the towing vehicle fuel economy remains between the upper and lower fuel economy thresholds. As such, the first vehicle SOC may increase at a higher rate than the rate between t2 and t3.

After t4, the first vehicle recuperative braking continues to increase since the towing vehicle fuel economy remains between the upper and lower thresholds. After t4, the first vehicle and the second vehicle SOCs continue to increase as the towing vehicle tows in a direction substantially toward a final desired destination.

Turning now to FIG. 7, it shows a method 700 for requesting a towing vehicle and selecting a towing vehicle for a towing operation.

The method 700 begins at 702, which includes determining if a towing vehicle recharge request is present. The towing vehicle recharge request may be requested via one or more of an operator selecting the towing vehicle recharge request via a navigation system, a mobile device (e.g., a phone), a laptop, a tablet, or other device. The operator may select the towing vehicle recharge request in response to a SOC of the vehicle falling below a lower threshold SOC. Additionally or alternatively, the operator may select the towing request in response to being stuck and/or being fatigued.

If the towing vehicle recharge request is not present, then the method 700 proceeds to 704, which includes maintaining a current operating parameter. As such, a towing vehicle is not selected.

If the towing vehicle recharge request is present, then the method 700 proceeds to 705, which includes comparing driving demands of the vehicle with towing operation of a plurality of towing vehicles. For example, a database, which may be stored in a server or the like, may compare information from the vehicle, including a SOC, a direction travel, a weight, and the like to conditions of the towing vehicle, including a tow load, a direction traveled, a travel speed, and the like. In one example, the tow load may be based on a current amount of cargo arranged on the towing vehicle along with a number of other vehicles already being towed by the towing vehicle. In this way, the vehicle may be matched with a towing vehicle of the plurality of towing vehicles comprising capabilities suitable for the towing operation requested.

The method 700 proceeds to 706, which includes determining if a SOC of the vehicle is greater than a lower threshold SOC. In one example, the lower threshold SOC is based on a distance between the vehicle and the towing vehicle along with an efficiency of the vehicle. If the SOC is less than or equal to the lower threshold SOC, then the vehicle may not comprise sufficient charge to reach the towing vehicle.

If the SOC is not greater than the lower threshold SOC, then the method 700 proceeds to 708, which includes stopping the vehicle. In this way, a towing vehicle is driven to the stopped vehicle.

The method 700 proceeds to 710, which includes connecting the towing vehicle to the vehicle while stationary. The towing vehicle and the vehicle may be connected via a tether or other physical coupling without electrically coupling the towing vehicle to the vehicle. That is to say, the towing vehicle may not be wirelessly or directly electrically coupled to the vehicle such that electrical power transfers therebetween. In one example, if the towing vehicle is already towing a vehicle, then the vehicle may be coupled to the vehicle coupled to the towing vehicle. Additionally or alternatively, the vehicles coupled to the towing vehicle may be reordered based on a SOC. In one example, the vehicle with a lower SOC may be coupled directly to the towing vehicle while the vehicle with the higher SOC is coupled to the vehicle coupled directly to the towing vehicle. In this way, the vehicle with the higher SOC may be decoupled quickly once it reaches a desired SOC during the towing operation.

If the SOC is greater than the lower threshold SOC, then the method 700 proceeds to 712, which includes locating the towing vehicle, communicating with the towing vehicle within a certain range of the towing vehicle at 714, and autonomously connecting with the towing vehicle while in motion at 716. In one example, the towing vehicle and the vehicle may communicate with regard to feedback from position sensors, proximity sensors, vehicle speed sensors, and the like to connect the vehicle to the towing vehicle. Additionally or alternatively, a towed vehicle coupled to the towing vehicle may communicate with the vehicle to couple the vehicle to the towed vehicle.

In this way, a vehicle operator of an electric vehicle may request a towing vehicle to pull the electric vehicle in a direction toward a desired final destination. A recuperation brake of the electric vehicle may be activated during the towing to replenish a state of charge of a battery of the electric vehicle. The technical effect of activating the recuperation brake of the electric vehicle during the towing is to allow the electric vehicle to be recharged via motive force of the towing vehicle without any further connections. By doing this, long distance traveling with an electric vehicle may be more simple with reduced reliance on an electric vehicle recharging infrastructure.

In one embodiment, a method for charging at least one traction battery of an electrically drivable motor vehicle, wherein the motor vehicle is towed in a towing operation via a towing vehicle, wherein at least one recuperation brake of the motor vehicle is kept continuously activated during the towing operation.

A first example of the method further includes where the motor vehicle is attached at least indirectly to the towing vehicle during a driving operation of the towing vehicle.

A second example of the method, optionally including the first example, further includes where the motor vehicle is attached directly to the towing vehicle or to at least one motor vehicle that is being towed by the towing vehicle.

A third example of the method, optionally including one or more of the previous examples, further includes where the towing vehicle is individually selected for the motor vehicle in that at least one piece of information relating to the towing vehicle is compared electronically on a web platform with at least one piece of information relating to the motor vehicle, wherein the pieces of information have been transmitted in advance by the towing vehicle or by the motor vehicle to the web platform.

A fourth example of the method, optionally including one or more of the previous examples, further includes where the motor vehicle is operated during the towing operation in such a manner that all the wheels of the motor vehicle roll on the surface being driven on.

A fifth example of the method, optionally including one or more of the previous examples, further includes where the motor vehicle is operated during the towing operation by a vehicle controller at least in part in an autonomous driving operation and/or at least in part while taking into consideration driving parameters of the towing vehicle.

A sixth example of the method, optionally including one or more of the previous examples, further includes where the motor vehicle is operated during the towing operation in such a manner that only the rear wheels of the motor vehicle roll on a surface that is being driven on, wherein the rear wheels are influenced via the recuperation brake with a braking force.

An embodiment of a system for charging at least one traction battery of an electrically drivable motor vehicle, comprises at least one electrically drivable motor vehicle and at least one towing vehicle for towing the motor vehicle in a towing operation, wherein the motor vehicle is configured so as to keep at least one recuperation brake of the motor vehicle continuously activated during the towing operation.

A first example of the system further includes where the motor vehicle is configured so as to tow a further electrically drivable motor vehicle.

A second example of the system, optionally including the first example, further includes where the motor vehicle is configured so as during the towing operation to be operated by a vehicle controller of the motor vehicle at least in part in an autonomous driving operation or at least in part while taking into consideration driving parameters of the towing vehicle.

In this way, towing vehicles, such as transporters or heavy-duty trucks, may be equipped with a towing device that can couple to a vehicle. The vehicle may be connected at standstill or while in motion based on an operator request in combination with a SOC of the vehicle. The vehicle may maintain at least some degree of recuperative braking active during a towing operation with the towing vehicle such that a battery charge is replenished without the use of electric cable or other connections between the towing vehicle and the vehicle. The technical effect of recharging the vehicle during the towing operation without electrical power being transported from the towing vehicle to the vehicle is to decrease a complexity of the recharge operation while enhancing long-range driving of the vehicle without dependence on a recharging infrastructure.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
activating a recuperative brake of a first vehicle in response to the first vehicle being towed via a second vehicle;
activating a recuperative brake of a third vehicle in response to the third vehicle being towed via the second vehicle;
adjusting a magnitude of the recuperative brake of the first vehicle in response to one or more conditions of the second vehicle including a vehicle speed, a vehicle load, and a second vehicle fuel economy;
equalizing recuperative braking between the first vehicle and the third vehicle in response to equal battery states of charge between the first vehicle and the third vehicle; and
increasing recuperative braking in one of the first vehicle and the third vehicle in response to a battery state of charge of one of the first vehicle and the third vehicle being unequal to a battery state of charge of the other of the first vehicle and the third vehicle.

2. The method of claim 1, wherein the second vehicle is a towing vehicle, and wherein the first vehicle is an electric vehicle.

3. The method of claim 1, wherein the first vehicle is an electric vehicle and the second vehicle is an electric vehicle coupled to a towing vehicle.

4. The method of claim 1, further comprising maintaining the recuperative brake of the first vehicle active during an entire towing operation of the first vehicle.

5. The method of claim 1, prior to activating the recuperative brake of the first vehicle, coupling the first vehicle to the second vehicle while each of the first vehicle and the second vehicle is in motion.

6. The method of claim 1, further comprising requesting a towing operation prior to activating the recuperative brake of the first vehicle.

7. A system, comprising:
a first vehicle comprising a towing device;
a second vehicle comprising a battery and an electric motor;
a third vehicle; and
a controller comprising computer-readable instructions stored on non-transitory memory thereof that when executed enable the controller to:

determine a second vehicle tow request;

autonomously drive the second vehicle to the first vehicle;

couple the first vehicle to the second vehicle via the towing device, wherein coupling the first vehicle to the second vehicle via the towing device comprises maintaining the first vehicle and the second vehicle in motion while coupling the first vehicle to the second vehicle;

activate a recuperative brake of the second vehicle during an entirety of a towing operation;

equalize recuperative braking between the second vehicle and the third vehicle in response to equal battery states of charge between the second vehicle and the third vehicle; and increase recuperative braking in one of the second vehicle and the third vehicle in response to a battery state of charge of one of the second vehicle and the third vehicle being unequal to a battery state of charge of the other of the second vehicle and the third vehicle.

8. The system of claim 7, wherein the first vehicle is not configured to transfer electrical energy to the second vehicle.

9. The system of claim 7, wherein the towing operation is requested via a navigation system, a mobile device, a tablet, or a laptop.

10. The system of claim 7, wherein the first vehicle and the second vehicle communicate during the towing operation.

11. The system of claim 10, wherein a magnitude of the recuperative brake of the second vehicle is adjusted in response to an engine operation of the first vehicle.

12. The system of claim 7, wherein the towing operation comprises all the wheels of the second vehicle touching a ground on which the first vehicle drives.

13. The system of claim 7, wherein the towing device is rigid or flexible.

* * * * *